(12) United States Patent
Li et al.

(10) Patent No.: US 7,332,003 B1
(45) Date of Patent: Feb. 19, 2008

(54) HYDROCARBON FUEL PROCESSING FOR HYDROGEN GENERATION

(75) Inventors: Zhijiang Li, Franklin, MA (US); Mark D. Fokema, Framingham, MA (US); Wendell E. Rhine, Belmont, MA (US)

(73) Assignee: Aspen Products Group, Inc., Marlborough, MA (US)

(*) Notice: Subject to any disclaimer, the term of this patent is extended or adjusted under 35 U.S.C. 154(b) by 491 days.

(21) Appl. No.: 10/932,974

(22) Filed: Sep. 2, 2004

Related U.S. Application Data

(60) Provisional application No. 60/500,134, filed on Sep. 4, 2003.

(51) Int. Cl.
*C10J 3/46* (2006.01)
*B01J 19/00* (2006.01)

(52) U.S. Cl. .................. 48/197 R; 48/127.9; 48/61; 422/198

(58) Field of Classification Search ............... 48/197 R
See application file for complete search history.

(56) References Cited

U.S. PATENT DOCUMENTS

| | | | |
|---|---|---|---|
| 5,302,470 A | 4/1994 | Okada et al. ................ 429/17 |
| 5,516,344 A | 5/1996 | Corrigan .................... 48/127.9 |
| 5,686,196 A | 11/1997 | Singh et al. .................. 429/17 |
| 5,931,658 A | 8/1999 | Sederquist et al. ......... 431/207 |
| 6,120,923 A | 9/2000 | Van Dine et al. ............. 429/17 |
| 6,126,908 A | 10/2000 | Clawson et al. ............ 422/190 |
| 6,156,084 A | 12/2000 | Bonville, Jr. et al. ........... 48/61 |
| 6,159,256 A | 12/2000 | Bonville, Jr. et al. ........... 48/61 |
| 6,210,821 B1 | 4/2001 | Lesieur et al. ................ 429/17 |
| 6,232,005 B1 | 5/2001 | Pettit .......................... 429/19 |
| 6,254,839 B1 | 7/2001 | Clawson et al. ............ 422/190 |
| 6,296,814 B1 | 10/2001 | Bonk et al. ................ 422/196 |
| 2002/0090327 A1* | 7/2002 | Deshpande ................ 422/190 |
| 2002/0121459 A1* | 9/2002 | Pradhan et al. ............... 208/88 |

* cited by examiner

*Primary Examiner*—Glenn Caldarola
*Assistant Examiner*—Matthew J Merkling
(74) *Attorney, Agent, or Firm*—Robert J. Sayre; Modern Times Legal

(57) ABSTRACT

An apparatus for processing hydrocarbon fuel (e.g., gasoline, kerosene, jet fuel, diesel and heating oil) to generate hydrogen ($H_2$), which can be used in fuel cells, includes a desulfurization reactor for removing sulfur from the fuel; a catalytic reactor for forming a reformate from the fuel; and, optionally, a separator for separating a light fraction of the fuel from a heavy fraction of the fuel. The fuel is first exposed to the desulfurization reactor and then, if present, to the separator. Finally, the fuel is exposed to the catalyst in the catalytic reactor; and the hydrogen gas generated there from is collected for use in the fuel cell.

16 Claims, 4 Drawing Sheets

HYDROCARBON FUEL PROCESSING FOR HYDROGEN GENERATION

RELATED APPLICATION

This application claims the benefit of U.S. Provisional application No. 60/500,134, filed Sep. 4, 2003, the entire teachings of which are incorporated herein by reference.

BACKGROUND

Hydrogen is playing an increasingly important role in clean combustion and zero-emission power generation. Fuel cells operating on pure hydrogen or hydrogen-rich gas (reformate) have the potential to revolutionize power generation for both stationary and transportation applications. Distribution of hydrogen to fuel-cell devices poses significant technical difficulties due to hydrogen's low energy density, poor distribution infrastructure, and high cost. Thus, a great and practical interest for fuel-cell power generation units is the conversion of liquid hydrocarbon fuels, such as gasoline, kerosene, jet fuel, diesel fuel and heating oil, to a gaseous stream rich in hydrogen. One common attribute of these fuels is that they all contain high concentrations of sulfur. Typical sulfur concentration in commercial grade gasoline, diesel and jet fuels currently range from 200 to 3000 parts per million by weight (ppmw).

Conversion of hydrocarbon fuels to hydrogen and carbon oxides is generally carried out in a reactor vessel via one of three processes: stream reforming, partial oxidation and autothermal reforming. To increase the process efficiency and reduce the operating costs, catalysts are normally used in all these reforming processes. Commercially available catalysts for these reforming processes include transition metals, such as nickel, and noble metals, such as platinum, supported on ceramic oxides. However, none of these catalysts can be used to directly reform high-sulfur fuels, such as diesel and gasoline, because the catalysts are extremely sensitive to poisoning by sulfur. Even a few ppmw sulfur may cause severe deactivation of these catalysts.

In addition to poisoning reforming catalysts, sulfur also has a detrimental effect on fuel cell performance and thus needs to be removed from the hydrogen or reformate. For the most-commonly used polymer electrolyte membrane (PEM) and solid oxide fuel cells (SOFC), the presence of less than one part per million by volume (ppmv) sulfur in the feed stream can result in an immediate drop in fuel-cell efficiency. Therefore, to protect reforming catalysts and fuel cells, sulfur must be removed from hydrocarbon fuels that are to be used as feeds for fuel-cell power generation systems.

Existing systems and apparatuses for converting hydrocarbon fuels to sulfur-free gas streams suitable for use in fuel cells are disclosed in U.S. Pat. No. 6,159,256; U.S. Pat No. 6,156,084; U.S. Pat. No. 6,210,821; U.S. Pat. No. 5,302,470; and U.S. Pat. No. 5,686,196. The first three of these patents disclose two complicated systems for reforming sulfur-containing hydrocarbon fuels. The first system is based upon stream reforming, and the second is based upon autothermal reforming. In both systems, a fuel desulfurizer is used to remove sulfur from raw fuels before reforming. The fuel desulfurization is based on the well-known mechanism of reactive adsorption of sulfur on transition metals, such a nickel (e.g., RSR'+Ni→NiS+R"H, where R, R' and R" are different hydrocarbon groups). Although the process is capable of treating low-sulfur fuels with very-high sulfur removal efficiencies (to <1 ppmw), the process suffers from an inability to treat high-sulfur fuels, such as diesel and jet fuels, which typically contain hundreds of ppmw of sulfur, because of the formation of dense NiS shells on the outer surfaces of Ni particles; the NiS shells result in very-low sulfur uptake. As pointed out by Anumakoda, et al., in U.S. Pat. No. 6,221,280, a Ni:S weight ratio of at least 100:1 is needed for near complete removal of residual thiophenes from diesel or jet fuels. Thus, fuel desulfurization by this approach is costly and demanding in terms of metal weight and reactor volume.

The fuel processing systems disclosed in U.S. Pat. No. 5,302,470 and U.S. Pat. No. 5,686,196 employed another approach for desulfurization of raw fuels prior to stream reforming to convert desulfurized fuel into hydrogen-rich streams. The desulfurization process disclosed in these two patents is based on the traditional hydrodesulfurization (HDS) process widely used in the petroleum refining industry. In the HDS process, a raw fuel is mixed with gaseous hydrogen and fed into a reactor containing $CoMo/Al_2O_3$ or $NiMo/Al_2O_3$ catalyst at high temperature and pressure. Sulfur compounds in the fuel react with hydrogen (hydrogenation) over the catalysts to form hydrogen sulfide via the following reaction: $RSR'+2H_2 \rightarrow RH+R'H+H_2S$. The $H_2S$ is then removed with a regenerable metal or metal oxide absorbent, such as ZnO or CuO, via the following sulfiding reaction: $H_2S+MO \rightarrow MS+H_2O$. The two reactions can be carried out in a single reactor by mixing the hydrogenation catalysts and the absorbent materials together. It is well known that in order to reach high efficiencies in desulfurizing heavy hydrocarbon fuels, such as diesel and jet fuels, the HDS process has to be operated at very-high pressure and with large amounts of excess hydrogen. While the process may be effective for use in larger, stationary hydrocarbon reforming systems, it is not attractive for smaller, mobile fuel reforming applications because of its dependence on an external hydrogen feed, large system size, complexity, and high operating pressure.

U.S. Pat. No. 6,296,814; U.S. Pat. No. 6,120,923; U.S. Pat. No. 5,931,658; U.S. Pat. No. 5,516,344; U.S. Pat. No. 6,254,839; U.S. Pat. No. 6,126,908; and U.S. Pat. No. 6,232,005 disclose a number of integrated apparatuses for reforming light hydrocarbon fuels. None of these patented designs contained a fuel desulfurizer, and thus these apparatuses are not employed to convert high-sulfur fuels into sulfur-free hydrogen or reformate for clean combustion or fuel cell power generation.

Consequently, there is a need for compact and efficient fuel processors for converting sulfur-containing hydrocarbon fuels into sulfur-free and hydrogen-rich gaseous streams.

SUMMARY

The following description relates to a fuel processing apparatus and method for hydrogen generation, and more particularly, to an integration of several components for processing hydrocarbon fuels having substantial sulfur contents into a hydrogen-rich fuel suitable for use as a feed for a fuel cell power generator.

The hydrocarbon fuel can be processed by passing the fuel through a desulfurization reactor. After desulfurization, the fuel can optionally be fed through a separator that separates a light fraction of the fuel from a heavy fraction, based on constituent boiling points. Where the separator is used, the light fraction is passed through a catalytic reactor that converts the light fraction into reformate containing hydrogen gas. Absent the use of a separator, the entire desulfurized fuel stream can be passed through the catalytic reactor.

An embodiment of a fuel-processing apparatus for hydrogen ($H_2$) generation is described, as follows. The fuel-processing apparatus includes a catalytic reactor, located in the center of the apparatus, in which fuel, air and water react to form reformate. Multiple tubular regenerable desulfurization reactors (desuflurizers) are located around the catalytic reactor. The catalytic reactor and the desulfurizers are enclosed in a chamber having thermal-insulation materials attached to its wall to prevent heat loss from the apparatus. The desulfurizers communicate thermally with the catalytic reactor via conduction, convection and radiation to permit transfer of heat between the desulfurizers and catalytic reactor.

There may be two or more tubular separators on the side of the chamber, and these separators are enclosed by separate cylindrical housings. A multi-port fuel-distribution valve is located on the top of the chamber. The valve has one fuel inlet, one air outlet and multiple fuel outlets and air inlets that are connected to each desulfurizer. By switching this fuel-distribution valve to different positions, at least one desulfurizer is operated in regeneration mode (in which sulfur species are emitted from the desulfurizer), and the rest of the desulfurizers are operated in desulfurization mode (in which sulfur species are absorbed in the desulfurizer). Two vessels beneath the reactor chamber are connected to the outlet of each desulfurizer. One vessel acts as a fuel collector to collect desulfurized fuels from the desulfurizers and to direct the fuel to the separators. The second vessel acts as air distributor to distribute air to desulfurizers that are in regeneration mode. On each of the tubes connecting the fuel collector and the desulfurizer outlets, there is a check valve that permits fuel to flow only from the desulfurizers to the fuel collector. On each of the tubes connecting the air distributors to the desulfurizer outlets, there is a check valve that permits air to flow only from the distributor to the desulfurizers. A burner is located beneath the catalytic reactor to provide heat for operation of the apparatus.

An exemplary method for operating the fuel-processing apparatus includes feeding a raw hydrocarbon fuel into the fuel inlet of the fuel distribution valve. The valve distributes the raw fuel evenly to desulfurizers that are in desulfurization mode. The desulfurizers contain metal- or metal-oxide-based absorbents and are operated at a pressure between about 790 kPa and 3.5 MPa and a temperature between about 300° C. and 600° C. In the desulfurizers, sulfur contained in the raw fuel is removed by reaction with the absorbent materials to form metal sulfides. Desulfurized fuel from the desulfurizers is collected in the fuel collector and flows to the separators; the separators separate the desulfurized fuel into a light fraction and a heavy fraction based upon boiling points. The light fraction of desulfurized fuel exits from the top of the separators and mixes with a controlled amount of preheated air and water. The light-fraction fuel/air/water mixture then enters into the catalytic reactor where the light-fraction mixture is converted over a catalyst to a reformate gas stream primarily comprising hydrogen, carbon monoxide, carbon dioxide, water, nitrogen and methane. The heavy fraction of the desulfurized fuel may flow to the burner in order to provide heat for operation of the apparatus, or the heavy fraction of the desulfurized fuel may return to the unprocessed diesel fuel tank in order to subsequently pass through the desulfurization apparatus an additional time.

Simultaneously, air is supplied to the air distributor, where the air is further directed to desulfurizers that are operating in regeneration mode. During regeneration, metal sulfides that are formed during the desulfurization mode react with oxygen contained in air to form sulfur oxides, thereby restoring the absorbent to tis active form. Sulfur oxides pass from the desulfurizers to the multi-port fuel-distribution valve. The sulfur oxide containing effluent exits from the fuel-processing apparatus at the air-outlet port on the multi-port valve.

At each state of the multi-port fuel distribution value, at least one desulfurizer is in regeneration mode, while the rest of the desulfurizer are in desulfurization mode. By switching the value to the next state, a regenerated desulfurizers is switched back to desulfurization mode, and another desulfurizer is switched to regeneration mode. By operating the apparatus in this manner, a continuous, stable and sulfur-free reformate is produced.

In another embodiment of the fuel processing apparatus and method for converting a high sulfur hydrocarbon fuel into a hydrogen-rich stream, the apparatus does not include separators that separate the desulfurized fuel into light fraction and a heavy fraction based upon their boiling points. In this embodiment, the entire desulfurized fuel stream is mixed with a controlled amount of preheated air and water and passed through the catalytic reactor where the fuel-containing stream is converted over a catalyst to a reformate gas stream primarily comprising nitrogen, hydrogen, carbon monoxide, carbon dioxide, water and methane.

In another embodiment of the fuel processing apparatus and method for converting a high-sulfur hydrocarbon fuel into a hydrogen-rich stream, water is not employed as a feed to the apparatus. In this embodiment, the desulfurized fuel that passes to the catalytic reactor is mixed only with preheated air. The fuel/air mixture is converted over a catalyst to a reformate gas stream primarily containing nitrogen, hydrogen, carbon monoxide, carbon dioxide, water and methane.

In another embodiment of the fuel processing apparatus and method for converting a high sulfur hydrocarbon fuel into a hydrogen-rich stream, the apparatus does not include a multi-port fuel distribution valve. In this embodiment, all of the desulfurizers are operated at the same time and all of the desulfurizers are regenerated at the same time. Desulfurizer operation and regeneration occur sequentially, with desulfurizer regeneration taking place when reformate production is not required.

The apparatus and methods described herein offer many advantages over existing approaches. The fuel processing apparatus and methods can operate on a variety of hydrocarbon fuels, such as gasoline, kerosene, jet fuel, diesel and heating oil, and convert them into sulfur-free reformate. Gaseous fuels that contain sulfur, such as natural gas, propane, LPG and naphtha can also be processed with the apparatus and methods. The use of regenerable desulfurizers can reduce the volume of the fuel processor devoted to the task of desulfurization and can eliminate the need to periodically replace or otherwise maintain desulfurization system components. The regenerable desulfurizers can also mitigate problems associated with the vaporization of heavy distillate fuels because any carbonaceous residue that may form upon conversion of the liquid fuel into a gaseous state can be removed from the fuel-processing apparatus during regeneration. The multi-port valve of the apparatus allows saturated desulfurizers to be regenerated one at a time without disruption to the production of the sulfur-free reformate. The configuration of the catalytic reactor relative to the desulfurizers allows the heat generated by the chemical reaction within the catalytic reactor to be effectively utilized by the desulfurizers.

BRIEF DESCRIPTION OF THE DRAWINGS

In the accompanying drawings, described below, like reference characters refer to the same or similar parts throughout the different views. The drawings are not necessarily to scale, emphasis instead being placed upon illustrating particular principles of the methods and apparatus characterized in the Detailed Description.

DETAILED DESCRIPTION

Now, referring to FIGS. 1-4, features and details of the fuel processing apparatus and method are described. The same numeral present in different figures represents the same item. Particular embodiments are detailed, below, for the purpose of illustration and not as limitations of the invention.

Figure 1:
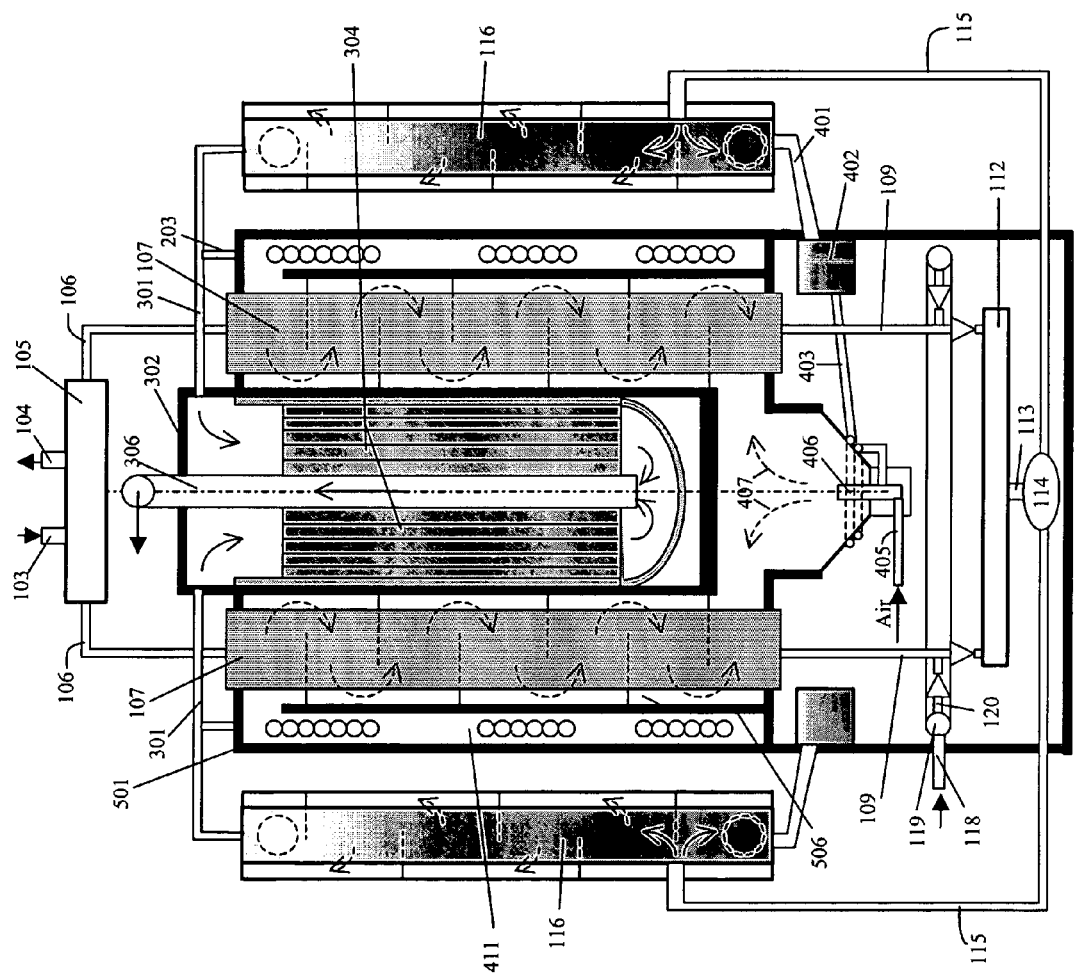
FIG. 1 is a cross-sectional side view showing selected elements of one embodiment of the apparatus.

Selected components of the apparatus are illustrated and labeled in FIG. 1. This figure is a simplified view of the more-detailed view presented in FIG. 2 and is provided for ease of illustrating broader aspects of the apparatus and method. The apparatus includes three principle components through which the hydrocarbon fuel is passed. Those components, through which the hydrocarbon fuel passes in sequence, are desulfurization reactors 107, separators 116, and a catalytic reactor 302.

In the illustrated embodiment, the hydrocarbon fuel enters a distribution valve 105 through an inlet 103 at the top of the apparatus and is therein distributed to tubes 106, which delivers the fuel to the desulfurizers 107. After passing through the desulfurizers 107, which remove sulfur from the fuel, the fuel is delivered via outlet tubes 109 to a fuel collector 112 at the bottom of the apparatus. From the fuel collector 112, the fuel is sent through outlet 113 to a pressure regulator 114, which distributes the fuel to tubes 115. The fuel is directed around and up the outside of the apparatus through tubes 115 to separators 116, which separate the fuel into light and heavy fractions.

The heavy fractions drop to the bottom of the separators 116 and are directed into an annular fuel tank 402, which delivers the heavy-fraction fuel to a burner 406 via tube 403. In the burner 406, the heavy fraction is mixed with air from inlet 405 and burned to generate a hot combustion gas 407, which heats the desulfurizers 107 and acts as a heat transfer medium between catalytic reactor 302 and desulfurizers 107.

The light fractions rise through the separators 116, are passed through the top of the separators 116, mixed with air and water, which are introduced through inlets 203, and passed to inlets 301, which direct the light-fraction/air/water feed into the top of the catalytic reactor. The feed passes down through a catalyst bed 304 in the reactor 302, which catalyzes a reaction of the fuel to produce reformate gas containing hydrogen gas. The reformate gas exits the bottom of the catalyst bed 304 and passes back up through a central tube 306 and out of the reactor 302. The reformate gas can then be used in a fuel cell or can then be purified and used in a fuel cell. Exemplary reactions that may occur within the catalyst bed 304 are as follows:

$C_nH_m + n/2\ O_2 \rightarrow n\ CO + m/2\ H_2$;
$C_nH_m + (m/4+n)\ O_2 \rightarrow n\ CO_2 + m/2\ H_2O$;
$C_nH_m + n\ H_2O \rightarrow n\ CO + (m/2+n)\ H_2$; and
$C_nH_m + n\ CO_2 \rightarrow 2n\ CO + m/2\ H_2$.

Figure 2:
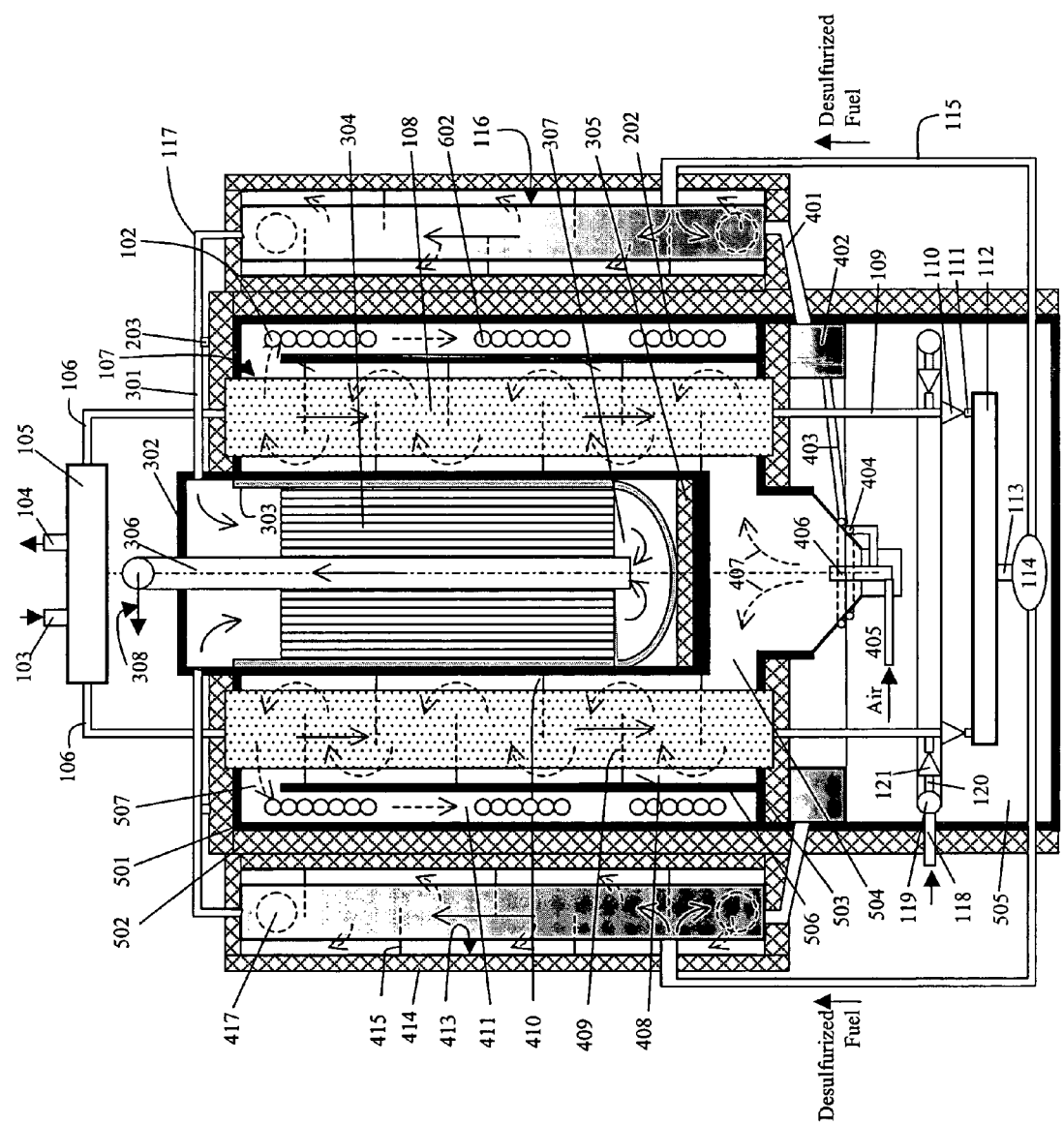
FIG. 2 is a more-detailed cross-sectional side view of the apparatus of FIG. 1.
Figure 3:
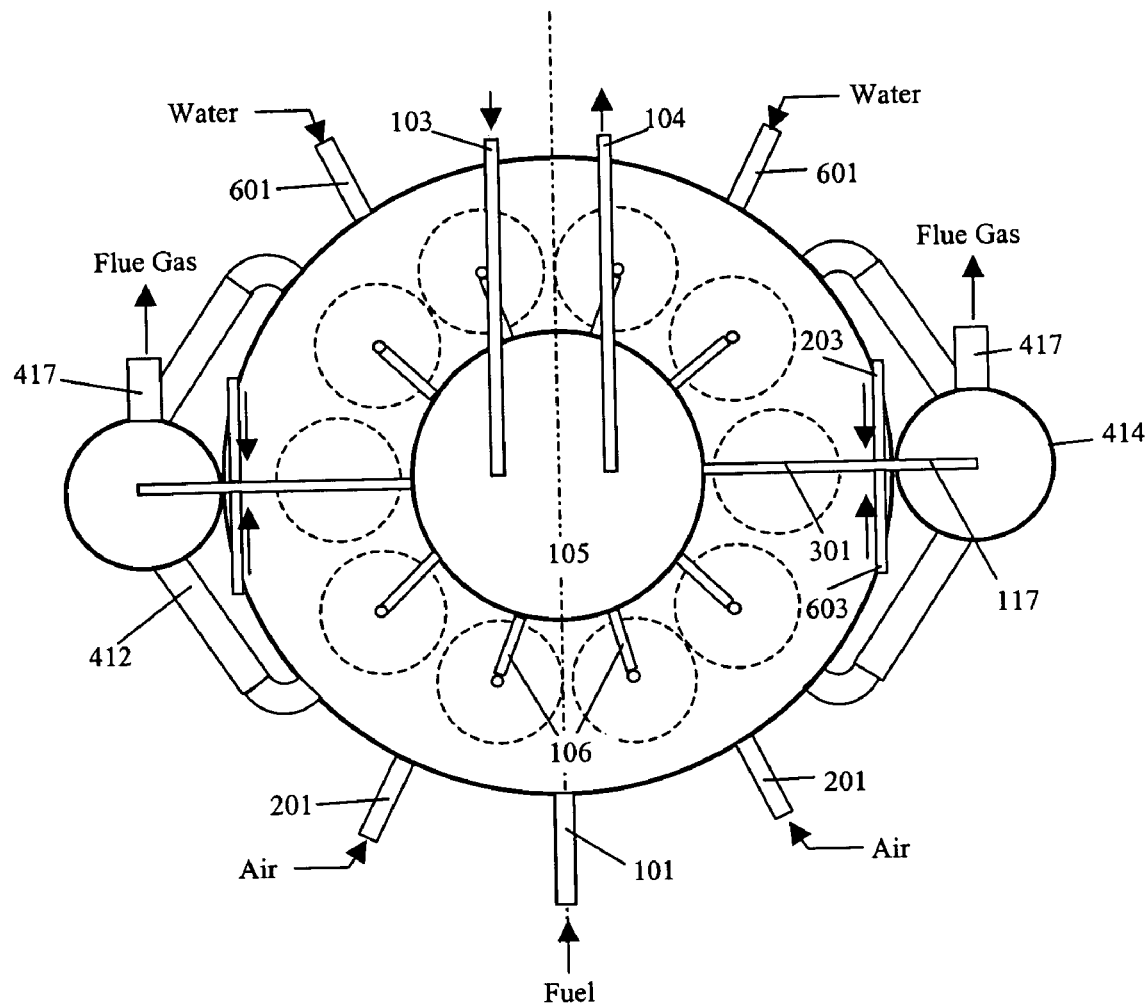
FIG. 3 is a top view of the apparatus of FIG. 2.
Figure 4:
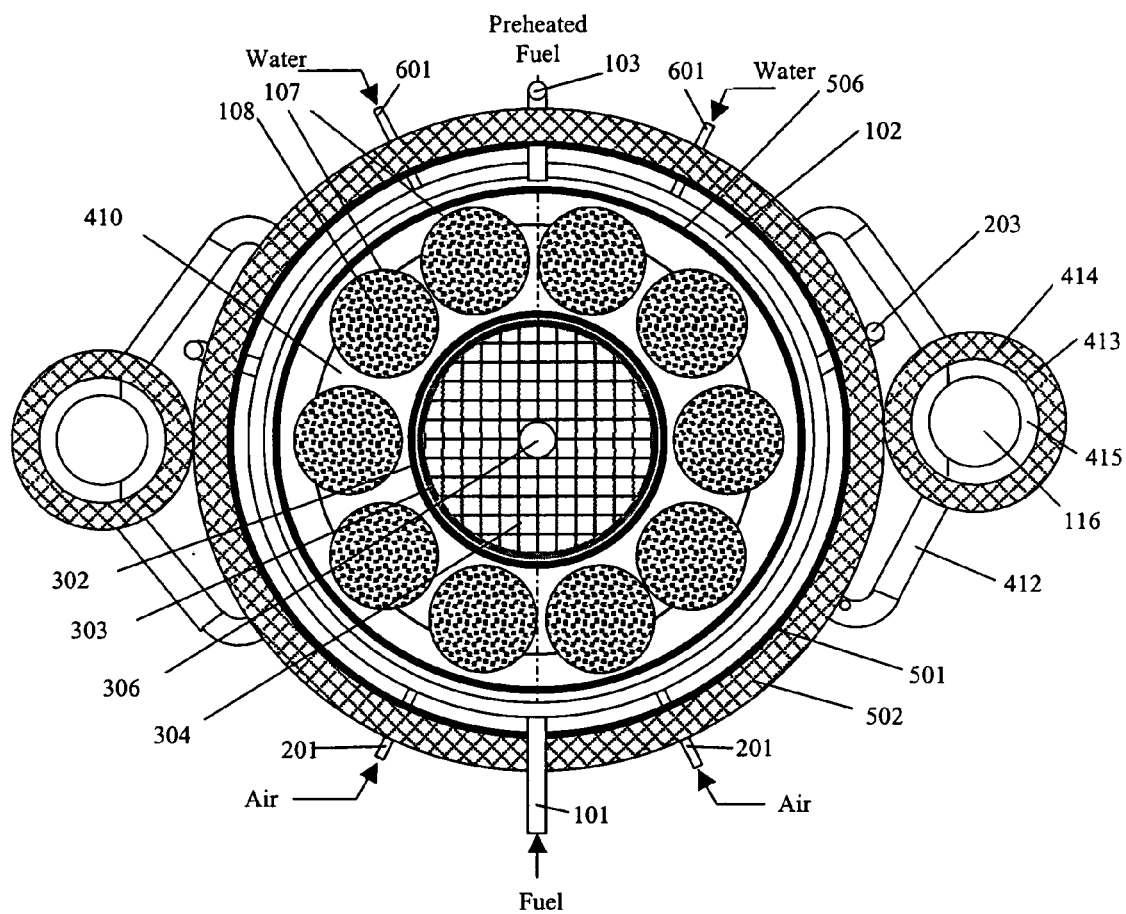
FIG. 4 is a cross-sectional top view of the apparatus of FIGS. 2 and 3.

This embodiment of the apparatus is shown in greater detail in FIGS. 2-4. The fuel processor has a cylindrical shell 501 that has thermal insulation materials 502 attached to its surface to prevent heat loss. An annular plate 503 divides the space inside the shell 501 into an upper chamber 504 and a lower chamber 505. In the upper chamber 504, a cylindrical catalytic reactor 302 is located in the center and supported by the top plate of shell 501. Two fuel/air/water inlets 301 are coupled with the upper section of reactor 302 to discharge a fuel/air/water mixture into the reactor 302. On the bottom of the reactor 302, there is a layer of insulation material 305, on top of which a ceramic liner 303 is located. Liner 303 is loosely in contact with the inside wall of the reactor 302. Liner 303 also holds the catalyst bed 304 in a way that there is a void space 307 beneath the catalyst bed 304. A tube 306 is inserted from the top of the reactor 302 along the center line of the catalyst bed 304, passes through the catalyst bed 304 and reaches space 307. Over the tube 306, reformed fuel 308 leaving the catalyst bed 304 is transported out of the reactor 302.

Surrounding the catalytic reactor 302 is a series of desulfurization reactors (desulfurizers) 107. In this particular embodiment, ten desulfurizers 107 are used. The desulfurizers 107 are evenly placed around the catalytic reactor 302 and supported by the top plate of shell 501 and the annular plate 503. Desulfurizers 107 contain granular sulfur-absorption materials 108, such as transition metal species supported on porous substrates, and are connected to a multi-port fuel distribution valve 105 through tubes 106. The distribution valve 105 has one fuel inlet 103, one outlet 104 and ten fuel outlet/air inlet tubes 106. Beneath each desulfurizer 107, there is a fuel outlet tube 109 that connects the desulfurizer 107 to a fuel collector 112 and to an air distributor 119.

The fuel collector 112 is cylindrical in shape and is used to collect desulfurized fuel from all ten desulfurizers 107. Fuel collector 112 has ten inlets 111 and one outlet 113. The outlet 113 is connected to a pressure regulator 114.

The desulfurizer outlets 109 are connected to the fuel collector inlet 111 via check valves 110 that allow the desulfurizer fuel to flow only in one direction from desulfurizers 107 to the fuel collector 112 when the pressure of the desulfurizer reaches a preset value. The air distributor 119 is a hollow ring and is used to direct air to the desulfurizer 107 that is being operated in regeneration mode. The air distributor has one inlet 118 and ten outlets 120. The air distributor outlets 120 are connected to the desulfurizer outlets 109 via check valves 121, which allow air to flow only in one direction from the air distributor 119 to the desulfurizers 107.

By installation of the check valves 110, the check valves 121 and the multi-port fuel-distribution valve 105, nine of the ten desulfurizers 107 are operated in desulfurization mode, and one is operated in regeneration mode. For the desulfurizers 107 that are in desulfurization mode, raw fuel flows from the top of the desulfurizers 107 to the bottom, while for the desulfurizer 107 that is in regeneration mode, air flow upwards. In this particular embodiment, only one desulfurizer 107 is operated in regeneration mode at any given time although the apparatus can be easily configured so that multiple desulfurizers 107 can be operated in regeneration mode at the same time.

The upper chamber 504 has an inner vertical wall 506. The void space between the inner wall 506 and the outer wall of partial oxidation reactor 302 forms an inner annular zone 408, where desulfurization reactors 107 are located. In the inner annular space 408, an inner set of fins 410 are attached to the outer walls of the partial oxidation reactor 302 and to desulfurizers 107; and an outer set of fins 409 are attached to desulfurizers 107 and to wall 506. Fins 409 and 410 form a tortuous passageway for the combustion gas and increase the heat transfer efficiencies of the partial oxidation reactor 302 and desulfurizers 107. A second annular zone 411 is formed between the wall 506 and the side wall of shell 501 in which coil 102 preheats raw fuel, coil 202 preheats air and coil 602 preheats water. There is a gap 507 along the upper edge of wall 506 that allows flue gas to leave space 408 and pass into space 411.

Two cylindrical separators 116, consisting of empty vessels or vessels filled with a porous packing, are symmetrically placed outside chamber 501. Each of the two separators 116 has a cylindrical housing 413 enclosing it. The two separators 116 are connected to the pressure regulator 114 via tubes 115. Each of the two separators 116 has two outlets 117 and 401. Outlets 117 are located on the top of the separators and connected to the partial oxidation reactor inlets 301. Outlets 401 are located on the bottom of the separators 116 and connected to an annular fuel storage tank 402. Housings 413 have insulation layers 414 that prevent heat loss. Housings 413 are connected to the preheating zone 411 via four tubes 412 (see FIGS. 3 and 4) that serve as the combustion gas inlets for the separator housings 413. In the space between the separators 116 and their housings 413, fins 415 form a tortuous passageway for the combustion gas and increase the heat transfer efficiencies of the separator 116. Combustion gas exits from the separator housing 413 from outlets 417.

In the lower chamber 505, an annular fuel tank 402 is attached to the side wall of shell 501 and is used to store the heavy fraction of desulfurized fuel from the separator 116 for burner 406. Burner 406 is located beneath the partial oxidation reactor 302 and is suspended from the annular dividing plate 503. The fuel for the burner 406 is supplied from the fuel tank 402 via tube 403 and preheating element 404. Air for the burner is provided from air inlet 405.

During operation, a raw hydrocarbon fuel is fed into the apparatus at inlet 101 (see FIGS. 3 and 4). The fuel is preheated in preheating coil 102 (see FIGS. 2 and 4) and flows upwards into the fuel distribution valve 105 via inlet 103. Valve 105 evenly distributes the preheated raw fuel into nine of the ten desulfurizers 107. In the desulfurizer 107, sulfur contained in the raw fuel is chemically absorbed onto the absorbent material 108. After exiting from the desulfurizers 107, desulfurized fuel flows into the fuel collector 112 via outlet 109 and check valve 110. From collector 112, the desulfurized fuel enters into separator 116 after being depressurized through pressure regulator 114.

In the separator 116, desulfurized fuel is separated into a light fraction and heavy fraction. The heavy fraction of the desulfurized fuel leaves the separator 116 via tubes 401 and enters into fuel tank 402 as fuel for burner 406. The light fraction of the desulfurized fuel leaves the separator via tubes 117 and is mixed with preheated air from preheating coil 202 and preheated water from preheating coil 602 through inlet 203. Air is supplied to coil 202 from inlet 201; water is supplied to coil 602 from inlet 601 (see FIGS. 3 and 4).

After mixing in tube 301, the fuel/air/water mixture enters into the catalytic reactor 302. While passing through the catalyst bed 304 in the catalytic reactor 302, the fuel/air/water mixture is reformed into a reformate stream comprising mainly $N_2$, $H_2$, CO, $CO_2$, $H_2O$ and $CH_4$. Exemplary catalyst beds 304 that may be used include noble metal or transition metal species supported on a monolithic or foamed ceramic substrate. The reformate gas 308 leaves the catalytic reactor 302 via tube 306 as the final product.

Simultaneously, air for desulfurizer 107 regeneration is fed into the air distributor 119 from inlet 118. Through check valve 121, the air flows upwards into one of the desulfurizers 107 that is operated in regeneration mode. During regeneration, sulfur is released from the absorbent material 108 as sulfur dioxide, which is carried out from the desulfurizer 107 through the outlet 104 on the fuel distribution valve 105.

Fuel for burner 406 is supplied from fuel storage tank 402 via tube 403. After being heated in coil 404, the fuel mixes with the combustion air that is supplied from inlet 405. The fuel/air mixture is combusted in burner 406 generating a hot combustion gas 407. The hot flue gas first flows in a radial direction to space 408 containing desulfurizer 107. In space 408, the flue gas moves upwards in a tortuous pathway to heat desulfurizers 107. Through gap 507 on wall 506, the flue gas makes a U-turn and enters into space 411 in which air, water and fuel are preheated. After leaving space 411, the flue gas enters into the two separator housings 414 via four tubes 412. In housing 414, the fuel gas moves upwards, also in a tortuous pattern, to heat separator 116. The flue gas finally leaves the separator housings 414 from outlets 417.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various other changes in form and details may be made therein without departing from the scope of the invention.

What is claimed is:

1. An integrated fuel-processing apparatus for converting hydrocarbon fuels into a hydrogen-rich gaseous stream, the apparatus comprising:
   a catalytic reactor coupled with a source of hydrocarbon fuel and with a source of air, the catalytic reactor comprising a catalyst that can cause a reaction involving the air and the hydrocarbon fuel that forms a hydrogen-rich product;
   multiple desulfurizers comprising a material that can remove sulfur from fuel, wherein the desulfurizers are located around the catalytic reactor, and wherein the desulfurizers are positioned to communicate thermally with the catalytic reactor to permit transfer of heat between the desulfurizers and the catalytic reactor; and
   inlets connected to the desulfurizers, wherein the inlets are configured to feed oxygen into the desulfurizers to regenerate the desulfurizers.

2. The apparatus of claim 1, wherein the catalytic reactor is also coupled with a source of water.

3. An integrated fuel-processing apparatus for converting hydrocarbon fuels into a hydrogen-rich gaseous stream, the apparatus comprising:
- a catalytic reactor coupled with a source of hydrocarbon fuel and with a source of air, the catalytic reactor comprising a catalyst that can cause a reaction involving the air and the hydrocarbon fuel that forms a hydrogen-rich product;
- multiple desulfurizers comprising a material that can remove sulfur from fuel, wherein the desulfurizers are located around the catalytic reactor, and wherein the desulfurizers are positioned to communicate thermally with the catalytic reactor to permit transfer of heat between the desulfurizers and the catalytic reactor;
- a fuel-distribution system connected to the desulfurizers to control passage of fuel and air through the desulfurizers; and
- a fuel manifold connected to the desulfurizers and positioned to collect desulfurized fuel after it has passed through a desulfurizer and to transfer the desulfurized fuel to the catalytic reactor.

4. The apparatus of claim 3, further comprising:
- an air-distribution manifold connected to the desulfurizers to supply air for desulfurizer regeneration; and
- a fuel combustor to provide heat for operation of the apparatus.

5. The apparatus of claim 4, further comprising:
- one or more separators configured to receive desulfurized fuel from the fuel manifold and to fraction the desulfurized fuel into a vapor fraction of light hydrocarbons as fuel for the catalytic reaction, and a liquid fraction of heavy hydrocarbons as the fuel for the combustor.

6. The apparatus of claim 3, further comprising:
- at least one preheating coil positioned to preheat reactants directed to the catalytic reactor; and
- a pressure regulation device positioned to receive desulfurized fuel after the fuel has passed through a desulfurizer and to reduce the pressure of desulfurized fuel.

7. The apparatus of claim 1, further comprising a chamber that encloses the catalytic reactor and the desulfurizers.

8. An integrated fuel-processing apparatus for converting hydrocarbon fuels into a hydrogen-rich gaseous stream, the apparatus comprising:
- a catalytic reactor coupled with a source of hydrocarbon fuel and with a source of air, the catalytic reactor comprising a catalyst that can cause a reaction involving the air and the hydrocarbon fuel than forms a hydrogen-rich product;
- multiple desulfurizers comprising a material than can remove sulfur from fuel, wherein the desulfurizers are located around the catalytic reactor, and wherein the desulfurizers are positioned to communicate thermally with the catalytic reactor to permit transfer of heat between the desulfurizers and the catalytic reactor; and
- a multi-port fuel-distribution valve, the multi-port fuel-distribution valve including a fuel inlet, an air outlet, and multiple fuel outlets and air inlets that are connected to each desulfurizer.

9. The apparatus of claim 8, wherein the multi-port fuel-distribution valve can be switched to different states to allow a selected desulfurizer to be regenerated, while the rest of the desulfurizers are desulfurizing the hydrocarbon fuel.

10. The apparatus of claim 1, wherein the desulfurizers contain metal- and metal-oxide-based absorbents.

11. The apparatus of claim 1, wherein the catalytic reactor includes a catalyst selected from transition metals and noble metals.

12. The apparatus of claim 1, wherein the desulfurizers are tubular regenerable desulfurization reactors.

13. The apparatus of claim 1, wherein the inlets are also connected to an air distributor to deliver air from the air distributor through the desulfurizers.

14. The apparatus of claim 8, further comprising a chamber that encloses the catalytic reactor and the desulfurizers, wherein the multi-port fuel-distribution valve is on top of the chamber.

15. The apparatus of claim 3, wherein the catalytic reactor is also coupled with a source of water.

16. The apparatus of claim 8, wherein the catalytic reactor is also coupled with a source of water.

* * * * *

UNITED STATES PATENT AND TRADEMARK OFFICE
CERTIFICATE OF CORRECTION

PATENT NO. : 7,332,003 B1  Page 1 of 1
APPLICATION NO. : 10/932974
DATED : February 19, 2008
INVENTOR(S) : Zhijang Li, Mark D. Fokema and Wendell E. Rhine It is certified that error appears in the above-identified patent and that said Letters Patent is hereby corrected as shown below:

In Col. 1, at each of lines 30 and 59, and in Col. 2, line 13, replace "stream" with --steam--.

In Col. 1, line 63, replace "a" with --as--.

In Col. 3, line 9, replace "desuflurizers" with --desulfurizers--.

In Col. 4, line 6, replace "tis" with --its--.

In Col. 4, line 13, replace "desulfurizer" with --desulfurizers--.

In Col. 4, line 14, replace "value" with --valve--.

In Col. 4, line 14, replace "desulfurizers" with --desulfurizer--.

In Col. 4, line 22, insert --a-- between "into" and "light".

In Col. 8, line 22, replace "desulfurizer" with --desulfurizers--.

In Claim 5, at Col. 9, line 31, replace "reaction" with --reactor--.

In Claim 8, at Col. 10, at each of lines 4 and 6, replace "than" with --that--.

In Claim 10, at Col. 10, line 24, replace "and" with --or--.

Signed and Sealed this

Third Day of June, 2008

JON W. DUDAS
*Director of the United States Patent and Trademark Office*